(12) United States Patent
Ramachandran et al.

(10) Patent No.: US 12,114,471 B2
(45) Date of Patent: Oct. 8, 2024

(54) ACTIVE SHIELD STRUCTURE

(71) Applicant: Arm Limited, Cambridge (GB)

(72) Inventors: Narayan Prasad Ramachandran, Bangalore (IN); Rainer Herberholz, Great Abington (GB); Peter Andrew Rees Williams, Great Abington (GB); Danny Joseph Traynor, Northampton (GB)

(73) Assignee: Arm Limited, Cambridge (GB)

( * ) Notice: Subject to any disclaimer, the term of this patent is extended or adjusted under 35 U.S.C. 154(b) by 639 days.

(21) Appl. No.: 16/933,886

(22) Filed: Jul. 20, 2020

(65) Prior Publication Data

US 2022/0022349 A1  Jan. 20, 2022

(51) Int. Cl.
| | |
|---|---|
| H05K 9/00 | (2006.01) |
| G06F 21/72 | (2013.01) |
| G06F 21/87 | (2013.01) |
| H01F 17/00 | (2006.01) |
| H01F 27/36 | (2006.01) |
| H01F 41/04 | (2006.01) |
| H01L 23/00 | (2006.01) |
| H01L 23/057 | (2006.01) |
| H01R 13/639 | (2006.01) |

(52) U.S. Cl.
CPC .......... *H05K 9/0071* (2013.01); *G06F 21/72* (2013.01); *G06F 21/87* (2013.01); *H01F 17/0006* (2013.01); *H01F 27/363* (2020.08); *H01F 41/041* (2013.01); *H01L 23/057* (2013.01); *H01L 23/576* (2013.01); *H01F 2017/0073* (2013.01); *H01L 2924/3025* (2013.01); *H01R 13/6397* (2013.01)

(58) Field of Classification Search
CPC ................. H01L 23/057; H01L 23/576; H01L 2924/3025; H01F 27/363; H01F 41/041; H01F 2017/0073; H01R 13/6397; H05K 9/0071

See application file for complete search history.

(56) References Cited

U.S. PATENT DOCUMENTS

| | | | |
|---|---|---|---|
| 9,455,233 B1 | 9/2016 | Bhooshan et al. | |
| 2004/0212017 A1* | 10/2004 | Mizuno ................ | H01L 23/576 |
| | | | 257/374 |
| 2019/0229089 A1* | 7/2019 | Zhou ..................... | H01L 23/552 |
| 2019/0303624 A1* | 10/2019 | Moss ..................... | H04L 9/003 |

(Continued)

FOREIGN PATENT DOCUMENTS

| | | | | |
|---|---|---|---|---|
| EP | 1273997 A2 | | 1/2003 | |
| FR | 2986632 A1 * | | 8/2013 | ........... H01L 23/576 |

OTHER PUBLICATIONS

PCT International Search Report and Written Opinion; PCT/GB2021/051767; Oct. 12, 2021.

*Primary Examiner* — D'Arcy Winston Straub
(74) *Attorney, Agent, or Firm* — Pramudji Law Group PLLC; Ari Pramudji

(57) ABSTRACT

Various implementations described herein are related to a device having a first coil-shaped spiral structure for an active shield and a second coil-shaped spiral structure that is wound in-between windings of the first coil-shaped spiral structure. The first coil-shaped spiral structure may provide for a coil-based electro-magnetic (EM) shield as a countermeasure circuit for protecting an underlying circuit.

18 Claims, 10 Drawing Sheets

(56) References Cited

U.S. PATENT DOCUMENTS

| | | | | |
|---|---|---|---|---|
| 2020/0043870 | A1* | 2/2020 | Rien | H01L 23/576 |
| 2021/0398918 | A1* | 12/2021 | Sohier | H01L 23/576 |
| 2022/0246538 | A1* | 8/2022 | Miyamoto | H01L 24/08 |

* cited by examiner

ACTIVE SHIELD STRUCTURE

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Sometimes, integrated electronic circuits may require tamper protection, which typically involves detecting cuts in metal interconnects and reporting alarms based on an active signal running through the drawn metal shield. This detection technique may typically involve metal lines being formed with a tight pitch that prevents openings from being cut without disrupting signal transmission. Also, in some cases, electro-magnetic side channel analysis may involve use of microscopic wires scanned over the front or back surface of an integrated circuit so as to pick-up electro-magnetic energy from internal circuit operation, which are typically used to discover secret keys in cryptographic operations. Unfortunately, standard active shields alone may not prevent side-channel attacks from electro-magnetic side channel analysis. Thus, there exists a need to improve conventional active shields so as to protect sensitive circuitry from electro-magnetic side channel analysis and/or various similar types of side-channel attacks.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Figure 1A:
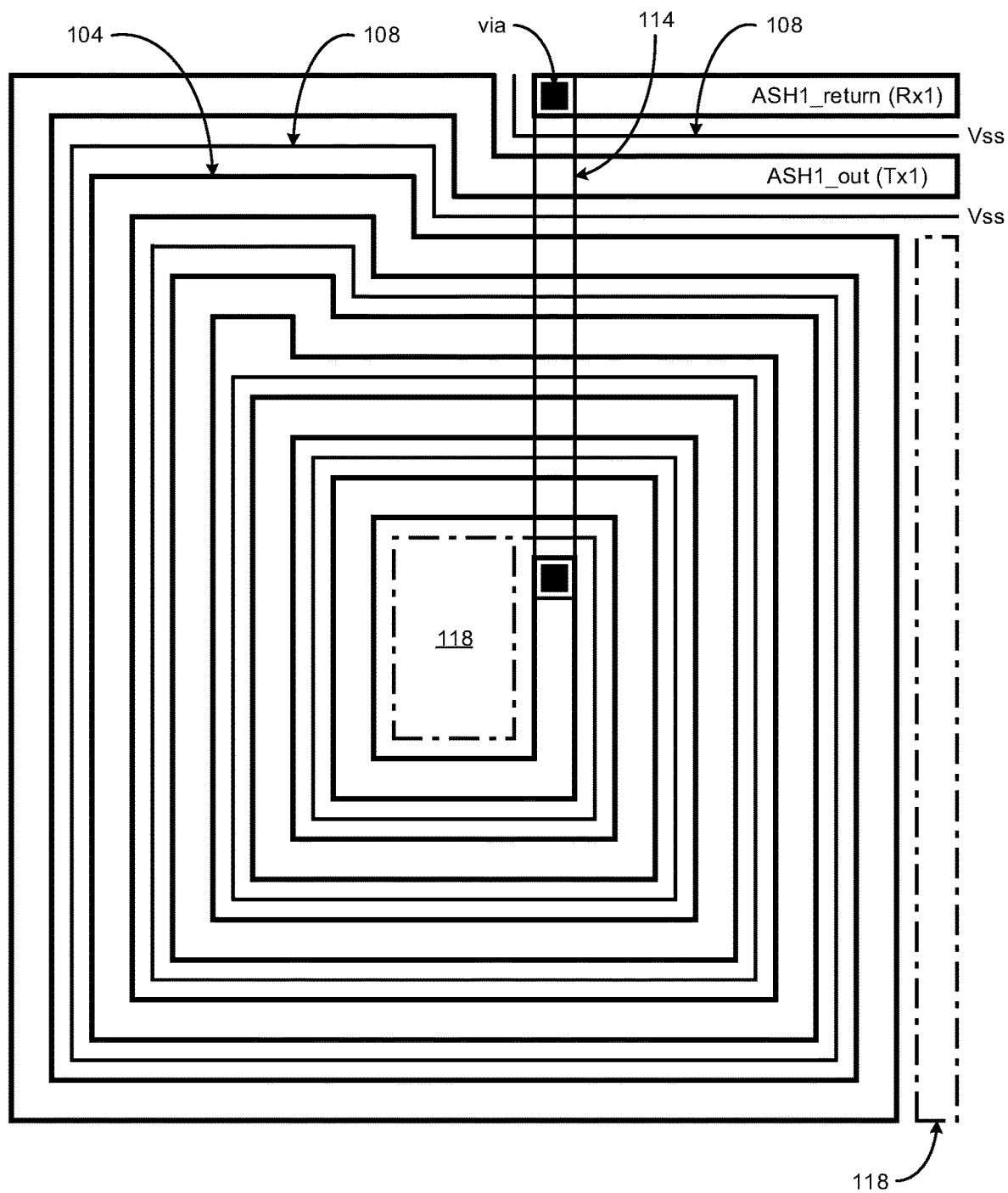
FIGS. 1A-1C illustrate diagrams of active shield coil structures in accordance with various implementations described herein.

Various implementations described herein refer to active shield (ASH) schemes and techniques for various tamper protection applications. For instance, various schemes and techniques described herein provide for a unified coil-based active tamper protection shield and electromagnetic (EM) analysis countermeasure circuit. The various schemes and techniques described herein combine protection countermeasures against physical modification and probing of a circuit with a countermeasure against electro-magnetic (EM) side channel analysis and/or various other types of similar attacks.

The various schemes and techniques described herein may be used to modify the physical layout design of the active shield (ASH) in a way that will generate a strong electro-magnetic (EM) signature so as to mask emanations from internal logic operations, while not consuming any additional circuit area on the integrated circuit (IC). To achieve this, various schemes and techniques described herein may arrange metal lines by forming a coil-shaped active tamper protection shield in the form-factor of an inductor, such as, e.g., a coil or loop structure. Thus, these coiled metal lines may be induced to emanate a strong magnetic field that is used to mask the electromagnetic leakage of the sensitive circuitry (or cryptographic security engine) disposed underneath.

The various active shield (ASH) schemes and techniques described herein may be used for combined active shield tamper protection and electro-magnetic side channel mitigation. For instance, to protect sensitive information against probing the electro-magnetic (EM) fields generated by internal operations, the various schemes and techniques described herein provide an active shield from coil-shaped units that are formed to cover sensitive circuitry. Also, the active coil-shaped shield has interconnect lines that carry signals generated within secure circuitry and are laid-out so as to generate an alarm signal if coiled lines are interrupted or shorted in a tampering attempt. The active coil-shaped shield may combine the protective function of the active shield with a countermeasure against EM side-channel analysis. The active coil-shaped shield also involves a modification of the active shield (ASH) design in a way that seeks to maximize the EM signature obtained from the operation of the active shield (ASH) to thereby mask emanations from internal logic operations, while not consuming additional power or circuit area on the integrated circuit (IC).

The various schemes and techniques described herein provide an EM-noisy active shield (ASH) by shaping the active shield (ASH) into coils (or loops) instead of conventional mesh arrangements, including the standard out-and-back layout. The EM-noisy active shield (ASH) generates constructive interference between the EM field generated by adjacent wire segments so as to enhance the EM noise generated relative to the power used to drive the active shield (ASH). Space between coils may be tamper-protected by a standard or regular mesh-type layout. VDD and VSS are used transfer power to the circuitry under the ASH as well as to prevent shorting of adjacent ASH segments that are part of the same lops. In some instances, the use of Vss or Vdd lines may be referred to as trip-wires. The purpose of a trip-wire is to prevent signal propagation in case a tamper attack involves shorting of adjacent ASH lines to deactivate the loop beyond the short. Widening the ASH lines for coils in conjunction with narrowing the trip-wire may be used to reduce RC wire-load per unit length to allow driving longer lines with the same ASH transmission (Tx) driver. Also, where not needed to transmit power, the Vss line (or the Vdd line) may be used solely as trip wires and kept at a narrow width so as to maintain tamper protection, while maximizing the area available for the coil turns. Also, signaling and/or delay of the active shield (ASH) may be aligned to the activity of the underlying cryptographic circuit, and the clock frequency and/or phase may be aligned such that the signal delay of the active shield coil may be aligned to cover the variety of data-path delays within the cryptographic circuitry, which may ensure that the EM noise is generated by the active shield (ASH) at the right time.

Various implementations of active shield protection schemes and techniques will be described in detail herein with reference to FIGS. 1A-5.

Figure 1B:
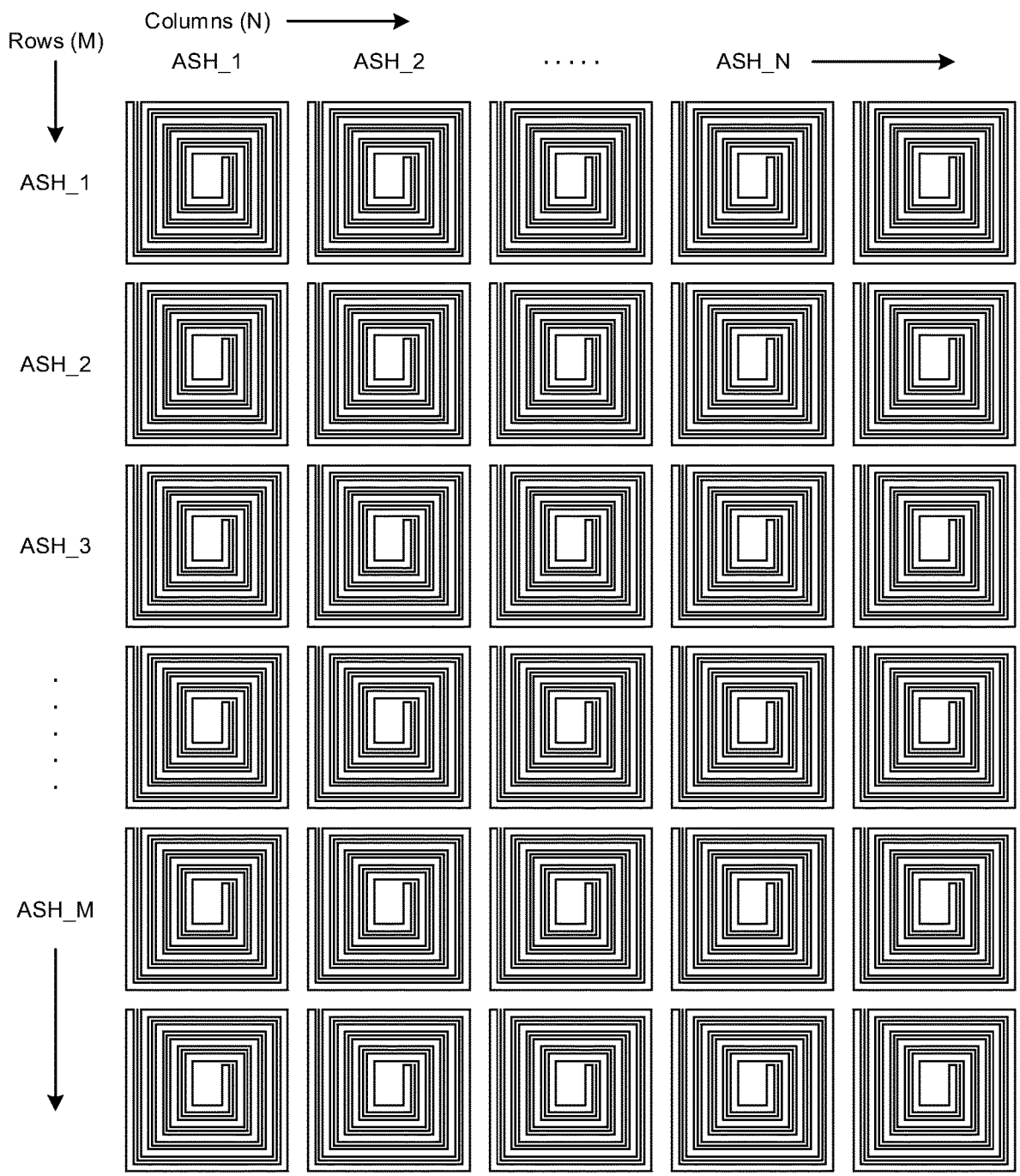
Figure 1C:
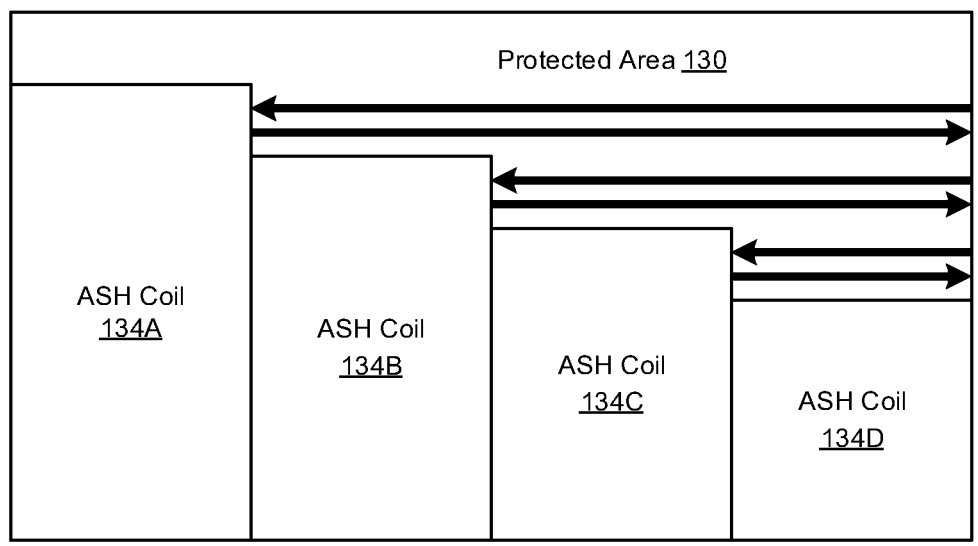

FIGS. 1A-1C illustrate various diagrams of an active shield coil structure 102 in accordance with various implementations described herein. In particular, FIG. 1A shows a top-view diagram 100A of the active shield coil structure 102, FIG. 1B shows another top-view diagram 100B of the active shield coil structure 102, and also, FIG. 1C shows a top-view diagram 100C of the active shield coil structure 102.

In various implementations, the active shield structure 102 may be implemented as a device or circuit having various components that are arranged and coupled together as an assemblage or combination of parts that provide for a physical circuit layout design and related structures. In some instances, a method of designing, providing and building the active shield coil structure 102 as an integrated device or circuit may involve the use of various components described herein so as to thereby implement various active shield techniques associated therewith. The active shield coil structure 102 may be integrated with various control circuitry and related components on a single chip, and the active shield coil structure 102 may be implemented in various embedded systems for automotive, electronic, mobile, computing and Internet-of-things (IoT) applications.

As shown in FIG. 1A, the active shield coil structure 102 may include a first coil-shaped spiral structure 104 that carries the signal of the shield. In some instances, the active shield may refer to a conductive interconnect line for transceiving a characteristic analog signal or digital code between a transmit node (Tx) and a receive node (Rx). Also, the active shield may be disposed such that a plurality of the conductive interconnect lines cover (or overlie) an area of sensitive circuitry (e.g., cryptographic circuitry) at routing levels and device levels disposed below the active shield. The first coil-shaped spiral structure 104 may be formed of a first conductive wire, and the first coil-shaped spiral structure 104 may be formed in a conductive layer, such as, e.g., a metal layer. Also, the first coil-shaped spiral structure 104 may be formed as a first continuous coil-shaped spiral structure.

The active shield coil structure 102 may include a second coil-shaped spiral structure 108 that is wound in-between windings of the first coil-shaped spiral structure 104. The second coil-shaped spiral structure 108 may be formed of a second conductive wire that is similar to the first conductive wire, and the second coil-shaped spiral structure 108 may be formed in a same layer as the first conductive wire. Also, in some instances, a width of the first conductive wire may be greater than a width of the second conductive wire. Moreover, the second coil-shaped spiral structure 108 may be formed as a second continuous coil-shaped spiral structure. In some instances, the second coil-shaped spiral structure 108 may be referred to as a trip-wire that is coupled to a fixed potential (e.g., Gnd or Vss or Vdd). Also, the trip-wire 108 may refer to a metal line that is inserted between each adjacent segment of signal wire 104 that is part of the same ASH loop. If the trip-wire 108 was absent, then adjacent wires may be shorted without detection, and an attacker may be free to tamper in the area of the signal loop/wire beyond the short. In various implementations, Vss lines or Vdd lines may be used as trip-wires, wherein the potentials of the Vss lines and/or the Vdd lines may also be needed to transfer power to underlying circuits.

In some implementations, as described herein below, the first coil-shaped spiral structure 104 may be coupled to a signal generator (e.g., 308 in FIG. 3) that provides for generating an electro-magnetic (EM) signal across the active shield, and the second coil-shaped spiral structure 108 may be coupled to a reference potential, such as ground (Gnd or Vss) or the supply voltage (Vdd). For instance, the EM signal may travel through the first coil-shaped spiral structure 104 via the transmit node (Tx1) to the receive node (Rx1), wherein the transmit node (Tx1) may be coupled to a first active shield transmit pin (ASH1_out), and wherein the receive node (Rx1) may be coupled to a first active shield return pin (ASH1_return). Also, in some instances, an underpass line 114 may be used to couple the first coil-shaped spiral structure 104 to the first active shield return line (ASH1_return), which may be formed in a different metal layer than the metal layer used to form the coil-shaped spiral structures 104, 108. Further, one or more vias are used to couple the underpass line 114 to the first active shield transmit line (ASH1_out) and the first active shield return line (ASH1_return).

In various implementations, the first coil-shaped spiral structure 104 and the second coil-shaped spiral structure 108 may be disposed in a same layer that overlies a cryptographic circuit, and also, a frequency of the EM signal may be aligned or harmonic with an operating frequency of the cryptographic circuit. Also, in some instances, a phase of the frequency of the EM signal may be aligned with a phase of the operating frequency of the cryptographic circuit. Thus, the first coil-shaped spiral structure 104 and the second coil-shaped spiral structure 108 may provide for a combined coil-based active tamper protection shield as a counter-measure circuit for protecting an underlying circuit from unauthorized attempts to access signals or physically modify underlying circuitry. Further, in some instances, the first coil-shaped spiral structure 104 may provide for a cooperative coil-based electro-magnetic (EM) signal generator as a counter-measure circuit for protecting the confidentiality of the operations performed by an underlying circuit.

Also, in various implementations, other areas 118 that are adjacent to the coil-shaped spiral structures 104, 108 may have a standard active shield (e.g., if they include circuitry requiring physical tamper protection). These other areas 118 may include boundary areas in a periphery of the metal layer and/or a central area in close proximity to the internal windings of the coil-shaped spiral structures 104, 108.

In some implementations, a pitch of the coil wire 104 may be slightly enlarged (e.g., at the top-left corner of FIG. 1A). For instance, if the coil wire 104 has a pitch of P, then the pitch of the coil wire 104 may be enlarged over a number of coil turns to ensure that no large gaps exist between windings. As shown in FIG. 1A, the enlarged pitch may be formed within three turns. In an actual layout, the enlarged pitch may be achieved with a script that automatically changes, and if a number of turns needed is N, then the increase in pitch may be reduced to P/N. In some instances, the coil wire 104 may have 40 turns, so the change in pitch may be quite small, and all of the area may remain protected. Also, any displacement of lines may need to snap in practice to the design grid such that, as in the instance shown in FIG. 1A, the layout design may be back on the original layout before reaching the centre of the coil wire 104 depending on the ratio of pitch, the number of turns, and/or the minimum design grid for the physical layout design.

As shown in FIG. 1B, an array of the active shield coil structures 102 (ASH) may be arranged in a grid pattern across a same layer that covers (or overlies) sensitive circuitry (e.g., crypto-circuit). In some instances, the array of active shield coil structures 102 may be arranged in some applicable configurations, such as, e.g., a two-dimensional (2D) array having any number (N) of columns along with any number (M) of rows (ASH_1:1, ASH_2:1 ,. . . , ASH_N:M) arranged in a 2D grid pattern. In some instances, each active shield coil structure 102 may have their own ASH_N:M_out lines and ASH:N:M_return lines for passing the EM signal therethrough. Also, multiple rows of this arrangement may extend tamper-protection in the y-direction. In some implementations, adjacent coils may be driven with different current directions so as to minimize the overall cancellation of electro-magnetic (EM) fields.

As shown in the top-view diagram 100C of FIG. 1C, the active shield (ASH) coil layer 102 may include active shield (ASH) coil structures 134A, 134B, 134C, 134D along with a protected area 130. Also, FIG. 1C shows that the protected area 130 may be tamper-protected by the ASH coil structures 134A-134D and their feeds. In some instances, each of the square areas 134A-134D may refer to an ASH coil structure. If the square areas 134A-134D were drawn to scale, the height of the areas 130A-130B may refer to a fraction of the height of the ASH coil structures 134A-134D. Thus, in reference to an attacker's coil probe (which may be much larger in diameter that the height of the feed areas 130A-130B), this may not be visible as a "gap in the protection".

Figure 2A:
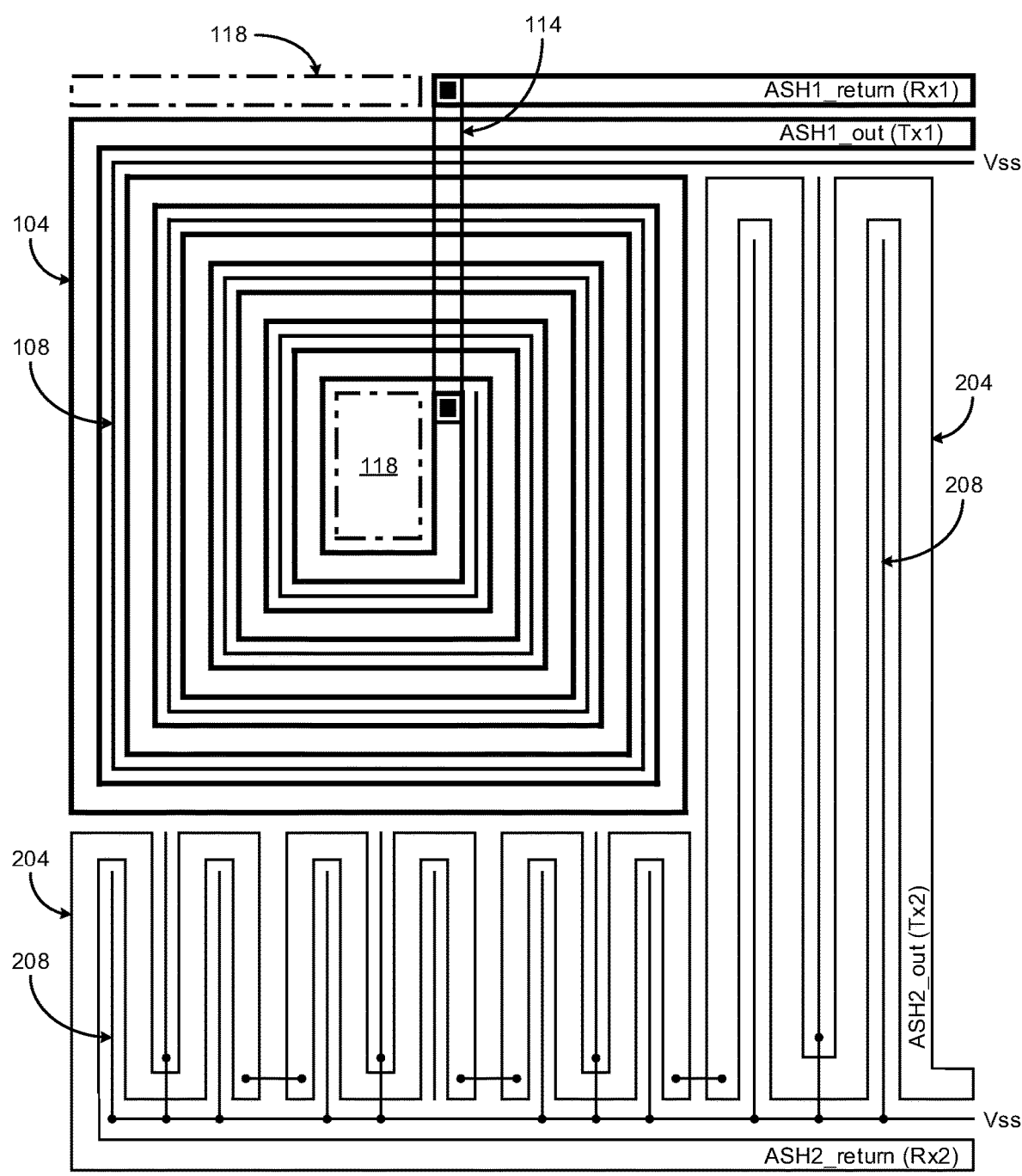
FIGS. 2A-2C illustrate various diagrams of combined active shields structures in accordance with various implementations described herein.
Figure 2B:
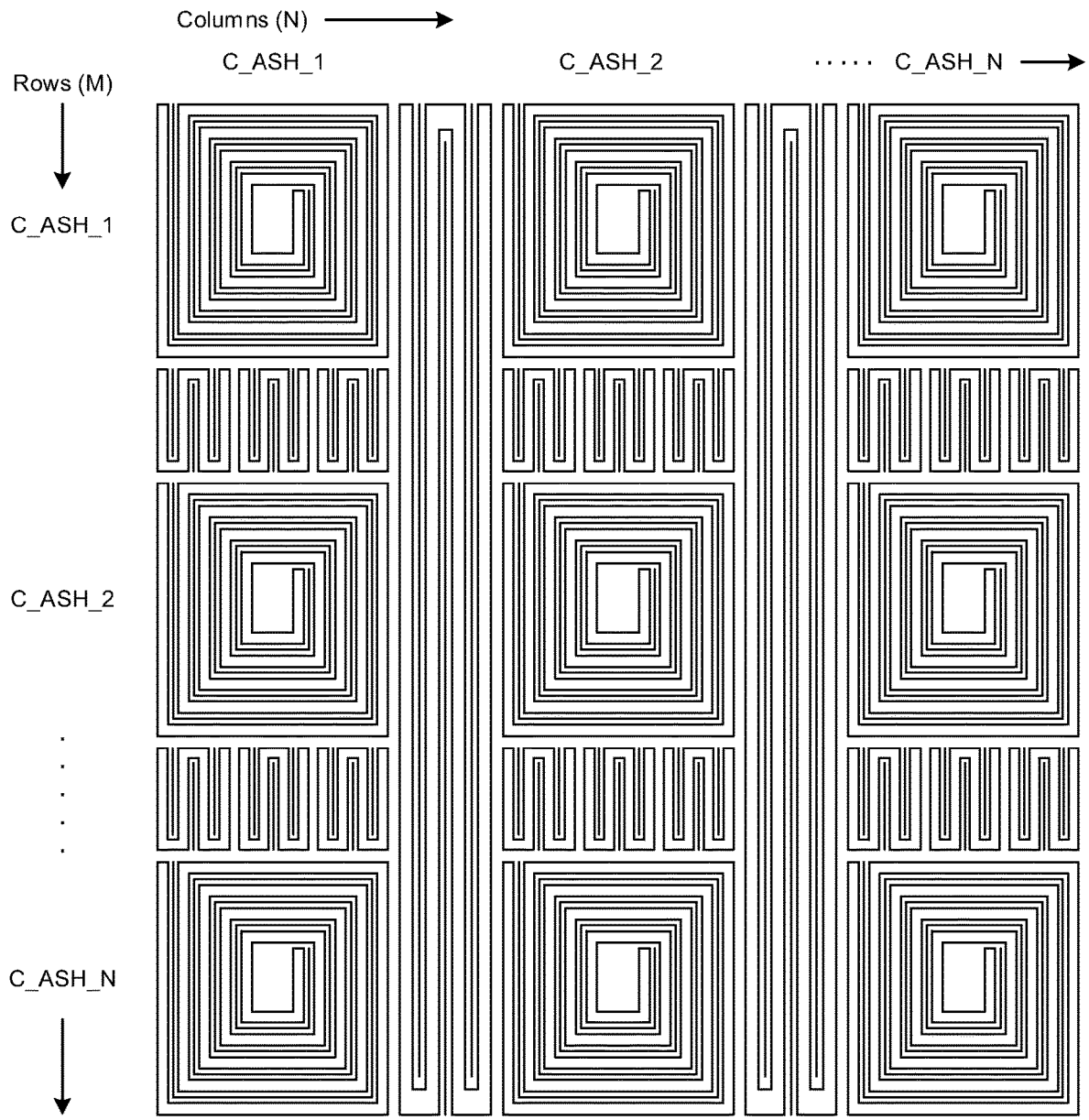
Figure 2C:
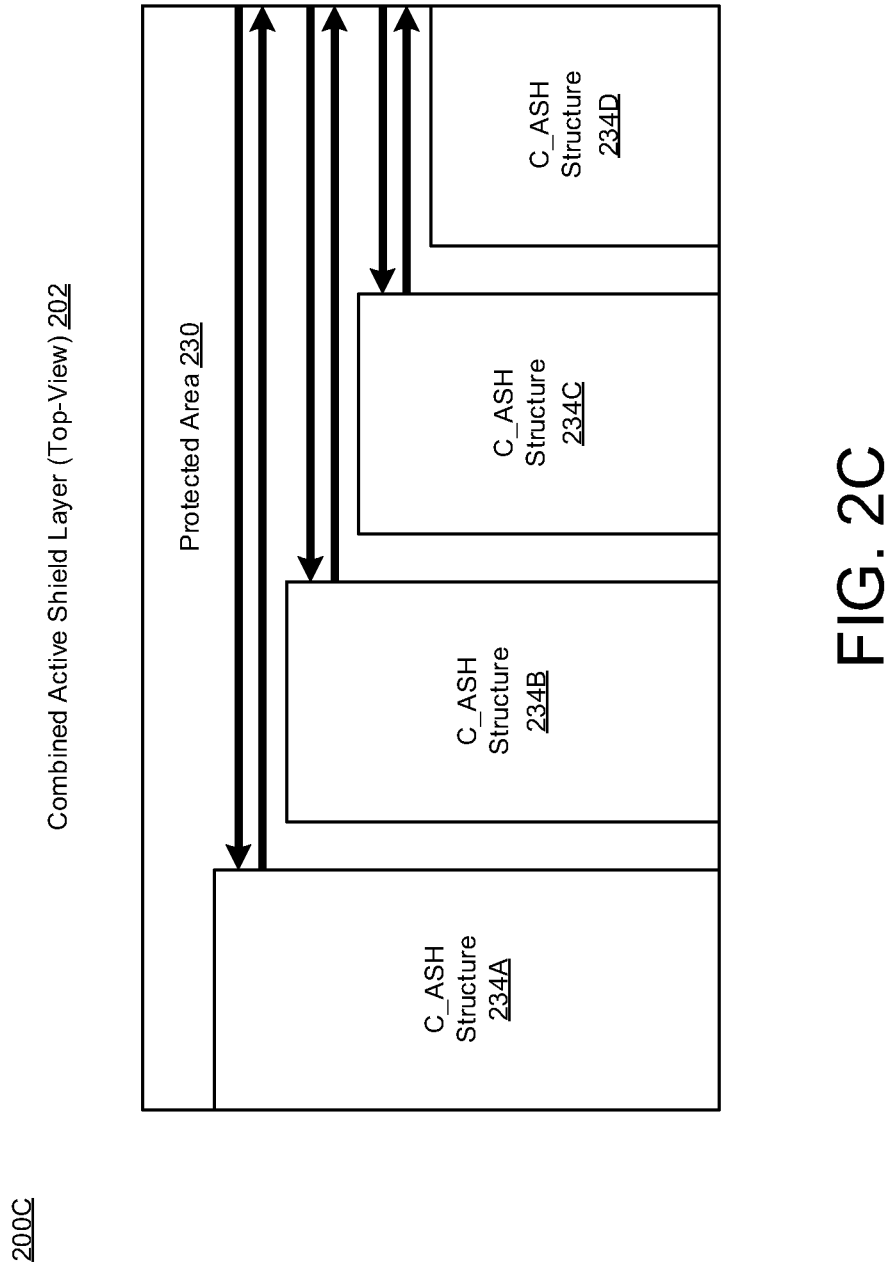

FIGS. 2A-2C illustrate various diagrams of combined active shield structures 202 in accordance with implementations described herein. In particular, FIG. 2A shows a top-view diagram 200A of the combined active shield structure 202, FIG. 2B shows another top-view diagram 200B of the combined active shield structure 202, and FIG. 2C shows a top-view diagram 200C of the combined active shield structure 202.

In various implementations, the combined active shield structure 202 may be implemented as a device or a circuit having various components that are arranged and coupled together as an assemblage or a combination of parts that provide for a physical circuit layout design and related structures. In various instances, a method of designing, providing and building the combined active shield structure 202 within an integrated device or circuit may involve the use of various components described herein so as to thereby implement various active shield schemes and techniques associated therewith. Also, the combined active shield structure 202 may be integrated with various control circuitry and related components on a single chip, and also, the combined active shield structure 202 may be implemented in various embedded systems for automotive, electronic, mobile and Internet-of-things (IoT) applications, including remote sensor nodes.

As shown in reference to FIG. 2A, the combined active shield structure 202 may include a first type of active shield (e.g., combination of 104, 108, 114) having a coil-shaped structure, such as, e.g., the active shield coil structure 102 in FIG. 1A. In some instances, the first type of active shield (104, 108, 114) may be formed with a first conductive wire (104, 114) and a second conductive wire (108) that is wound in-between the first conductive wire (104, 114). The width of the first conductive wire (104, 114) may be greater than the width of the second conductive wire (108). The first type of active shield (104, 108, 114) may be formed in a conductive layer, such as, e.g., a metal layer. In some implementations, the first conductive wire (104, 114) may carry the signal of the active shield (e.g., in a direction of the signal wire). Also, the second conductive wire (108) may have an intended use of preventing shorting of adjacent signal wires, which may deactivate the shield beyond the location of the short. The second conductive wire (108) may be referred to as a "trip-wire".

Also, the combined active shield structure 202 may include a second type of active shield (204, 208) having a linear-shaped or mesh structure, disposed adjacent to the first type of active shield (104, 108, 114). In some instances, the second type of active shield (204, 208) may be referred to as a standard active shield having multiple conductive lines that are configured as the linear-shaped or mesh structure. In some instances, the second type of active shield (204, 208) may be formed with a third conductive wire (204) and a fourth conductive wire (208) that is disposed side-by-side with the third conductive wire (204), and also, since there is a need to pass power through the metal layer of the shield, the width of the third conductive wire (204) may be smaller than a width of the fourth conductive wire (208). The second type of active shield (204, 208) may be formed in the same conductive layer, such as, e.g., the same metal layer.

In some implementations, the first type of active shield (104, 108, 114) and the second type of active shield (204, 208) may be combined in a single metal layer (e.g., the same metal layer) to provide an active tamper protection shield and an electro-magnetic (EM) shield as a combined counter-measure circuit for protecting an underlying cryptographic circuit against physical tampering and electro-magnetic side-channel attacks. Also, the other areas 118 that are adjacent to the coil-shaped spiral structures (104, 108) may have the standard active shield. These other areas 118 may include boundary areas in a periphery of the metal layer and/or a central area in close proximity to the internal windings of the coil-shaped spiral structures (104, 108).

In some implementations, as described in greater detail herein below, the first conductive wire (104, 114) may be coupled to a signal generator (e.g., 308 in FIG. 3) that drives a signal across the first type of active shield, and the second conductive wire (108) may be coupled to ground (Gnd or Vss) or power (Vdd). The signal may travel through the first conductive wire (104, 114) via the transmit node (Tx1) and the receive node (Rx1), wherein the transmit node (Tx1) may be coupled to the first active shield transmit line (ASH1_out as a connection point), and wherein the receive node (Rx1) may be coupled to the first active shield return pin (ASH1_return as another connection point). The signal driven by the transmitter is electric (i.e., current), and this electric signal travelling along a wire emits an electro-magnetic (EM) field (e.g., due to Maxwell's law and/or Ampere's law). Also, disposition of the signal line in a coil may lead to constructive interference between EM fields generated around each wire segment, whereas the mesh layout of the standard active shield may lead to field cancellation, as neighboring wire segments may have opposing current directions. ASH1_out and ASH1_return refer to connection points (or pins) of the signal wire, which is made up of 104 and 114 and includes the vias. Also, with the one or more vias, the underpass line (114) may be used to couple the first conductive wire (104, 114) to the first active shield return line (ASH1_return), which may be formed in a different metal layer than the metal layer used to form the coil-shaped spiral structures (104, 108).

Also, in some implementations, as described in greater detail herein below, the third conductive wire (204) may be coupled to a signal generator (e.g., 308 in FIG. 3) that provides a signal across the second type of active shield, and also, the fourth conductive wire (208) may be coupled to ground (Gnd or Vss) or supply (Vdd). In principle, the "trip wire" may be another reference potential that allows detecting a short to the signal wire either by the signal transmission being prevented or the reference potential or current being pulled. In some instances, power (Vdd) and ground (Vss) are must be fed to the circuitry protected by the active shield and it may therefore be advantageous to use Vdd and Vss feed-throughs as the potentials for the trip wires. Also, in some instances, different signal generators may be used to drive the ASH coils from the right-side or the left-side. For instance, considering FIG. 2C, area 230A (coil feeds) and 234A-234D (coils) may be driven from a signal generator on the right-side, and area 230C may be driven from another signal generator on the left-side. The signal may travel through the third conductive wire (204) via the transmit node (Tx2) and the receive node (Rx2), wherein the transmit node (Tx2) may be coupled to a second active shield transmit line (ASH2_out), and wherein the receive node (Rx2) may be coupled to a second active shield return line (ASH2_return).

In some instances, the number of TX and RX needed are one for each loop. In principle, all coils may be connected in series. However, the EM noise would sweep from one coil to the next coil. Thus, each coil may be no larger than the smallest practical coil an attacker would use for an EM side-channel attack (e.g., no greater than a maximum of a few 100 um). Hence, sweeping from one coil to a next coil using coil diameters similar to an attack coil may cause "holes" in the protection. Thus, in some implementations, at least 5 independent TX and 5 RX circuits may be used for the example in FIG. 2C with one for each coil on the right-side and at least one for the area 230C. In another example, a total of 8 ASH coils may be used, such as, e.g., 4 left and 4 right.

As shown in FIG. 2B, an array of the combined active shield structures 202 (C_ASH) may be arranged in a 2D grid pattern across a same layer that covers (or overlies) sensitive circuitry (e.g., crypto-circuit), wherein each of the C_ASH structures may be coupled to feeds as shown in FIG. 2A. In some instances, the array of combined active shield structures 202 may be arranged in some applicable configurations, such as, e.g., a 2D grid array having any number (N) of columns (C_ASH_1, C_ASH_2, . . . , C_ASH_N) along with any number (M) of rows (C_ASH_1, C_ASH_2, . . . , C_ASH_M) arranged in a 2D grid pattern. Also, each coil forms a loop that is driven from an individual TX at the ASH_out and received into an RX at the ASH_return pin. In some instances, each combined active shield structure 202 may have their own ASH1_out lines, ASH2_out lines, ASH1_return lines and ASH2_return lines that are used for passing EM signals therethrough, wherein each loop is driven individually to prevent losing protection against EM side-channel attacks.

As shown in the top-view diagram 200C of FIG. 2C, the combined active shield (C_ASH) layer 202 may include combined active shield (C_ASH) structures 234A, 234B, 234C, 234D along with a protected area 230. Also, FIG. 2C shows that the protected area 230 may be tamper-protected by the C_ASH structures 234A-234D and their feeds. In some instances, each of the square areas 234A-234D refer to a C_ASH structure. As shown in FIGS. 2A-2B, the combined active shield structure 202 may be formed with wide ASH lines and narrow Vss lines (or trip-wires) in the protected area 230 so as to be able to drive long coil wires (i.e., reduce RC load per unit length). In areas in which power is fed from a power-distribution network at higher metal layers to the sensitive circuitry 228 disposed below the C_ASH shield layer 224, the Vss line (or trip-wire) may be widened. This concept may enable landing vias from a higher metal, which may have a larger minimum line and space design rules in layers at which a shield is implemented. Also, in terms of a power distribution network, this concept may involve Vdd and Vss. Also, a Vdd line (or a Vss line) may be re-introduced (as may be provided in a standard shield), so that a via may be landed from a higher metal layer to thereby pass-down power. If the higher metal layer has a larger pitch than the metal layer of the shield, then the vias may be landed on larger than-minimum-rule metal shapes in the C_ASH shield layer 224. Thus, Vss lines (or trip-wires) that are disposed outside a coil shield structure may be alternating between Vdd and Vss. The ASH lines may be formed as entirely within one metal level in the same metal layer. Also, outside the coil shield structure, the Vdd lines and the Vss lines may be formed as relatively wider than the ASH lines.

Figure 3:
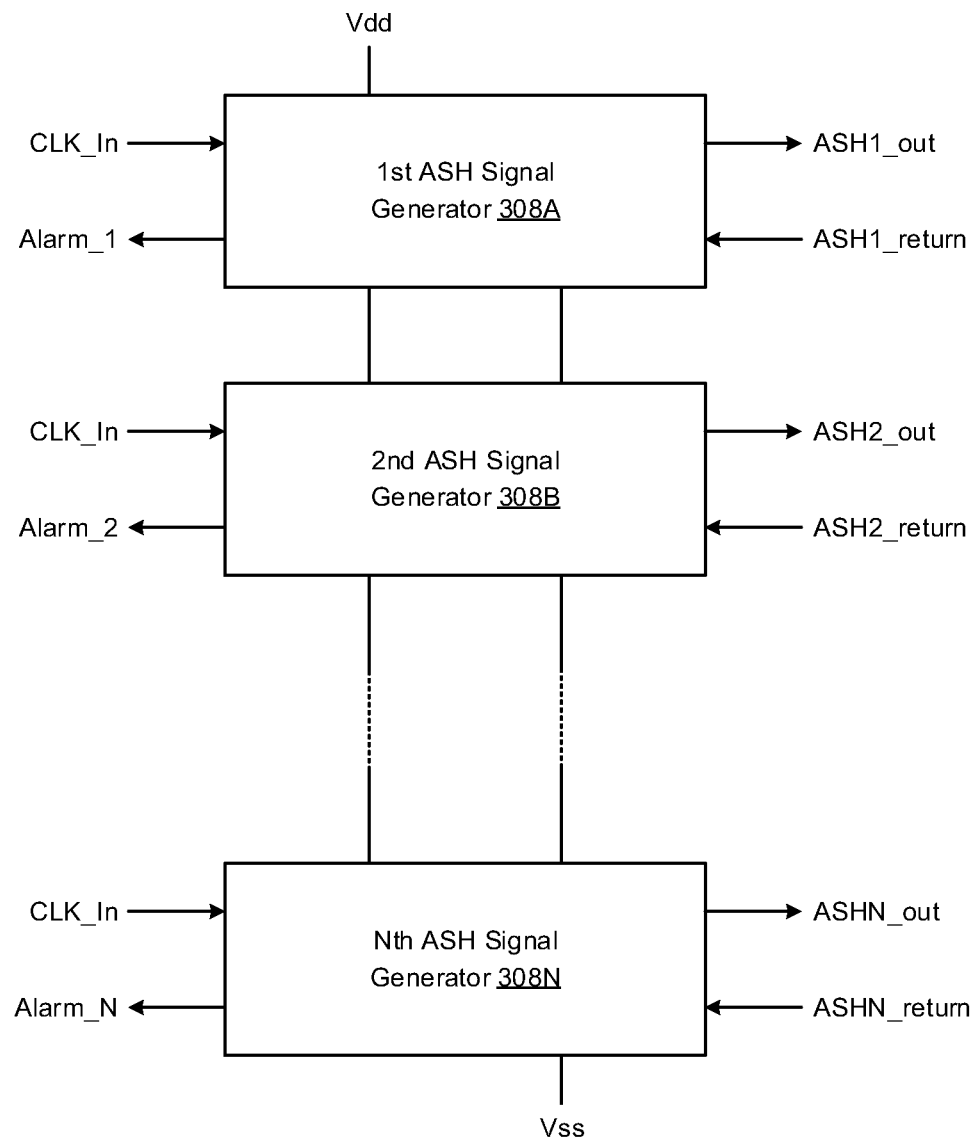
FIG. 3 illustrates a diagram of control logic circuitry in accordance with various implementations described herein.

FIG. 3 illustrates a diagram 300 of control logic circuitry 302 in accordance with various implementations described herein. In some implementations, a plurality of the control logic circuits 302 may be implemented to independently drive each active shield (ASH) coil and/or each standard active shield with separate TX/RX signals.

In various implementations, the control logic circuitry 302 may be implemented as a device or a circuit having various components that are arranged and coupled together as an assemblage or combination of parts that provide for a physical circuit layout design and related structures. In some instances, a method of designing, providing and building the control logic circuitry 302 as an integrated device or circuit may involve use of various components described herein so as to thereby implement various active shield schemes and techniques associated therewith. The control logic circuitry 302 may be integrated with various control circuitry and related components on a single chip, and the control logic circuitry 302 may be implemented in various embedded systems for automotive, electronic, mobile and Internet-of-things (IoT) applications.

As shown in FIG. 3, the control logic circuitry 302 may refer to a number (N) of active shield (ASH) signal generators (308A, 308B, . . . , 308N) that are configured to receive input signals and provide various output signals based on the input signals. In some instances, a signal may be generated and driven into a signal wire and then received back (as a return) and internal characteristics may be compared, and this comparison may be achieved by checking propagation of a digital state. Shorting a trip-wire may pull the signal and prevent the transmitted signal from being received. Hence, in FIG. 3, the ground refers to a ground pin (Vss) that the circuit uses to operate the same as a Vdd pin. Also, there may be control inputs, wherein a digital code is applied per cycle of the clock, e.g., via a control interface. In some instances, the input signals may refer to one or more input clock signals (CLK_In). Also, the output signals may refer to multiple sets of ASH signals (e.g., ASH1_out as an output, ASH1_return as an input, etc.) that are capable of supporting at least one ASH_EM, wherein the ASH1_out signal refers to a first transmit signal for the transmit node (Tx1) and also a first receive signal for the receive node (Rx1). As described herein, the EM signal may travel through the first coil-shaped spiral structure 104 (e.g., in FIG. 1A) via the transmit node (Tx1) and the receive node (Rx1), wherein the transmit node (Tx1) may be coupled to the first active shield transmit line (ASH1_out), and wherein the receive node (Rx1) may be coupled to the first active shield return line (ASH1_return). This idea may be repeated for multiple ASH signal generators (e.g., 308A, 308B, . . . , 308N) and their respective ASH out/return signals (e.g., ASH1_out/ASH1_return, ASH2_out/ASH2_return, . . . , ASHN_out/ASHN_return).

In some instances, a number (N) of TX/RX pairs may be used, whereby N may depend on the length of wire that a single TX/RX can drive and the total area that requires tamper protection. For instance, a single ASH signal generator may have one TX and one RX, and a number (N) instances of the single ASH signal generator may be used. Further, as described herein, the EM signal may travel through the first linear-shaped structure 204 (e.g., in FIG. 2A) via the transmit node (Tx2) and the receive node (Rx2), wherein the transmit node (Tx2) may be coupled to the second active shield transmit line (ASH2_out), and wherein the receive node (Rx2) may be coupled to the second active shield return line (ASH2_return). Also, in some instances, the ASH signal generators (308A, 308B, . . . , 308N) may be configured to provide a corresponding alarm (e.g., Alarm_1, Alarm_2, . . . , Alarm_N) when a tampering event has been detected.

Figure 4:
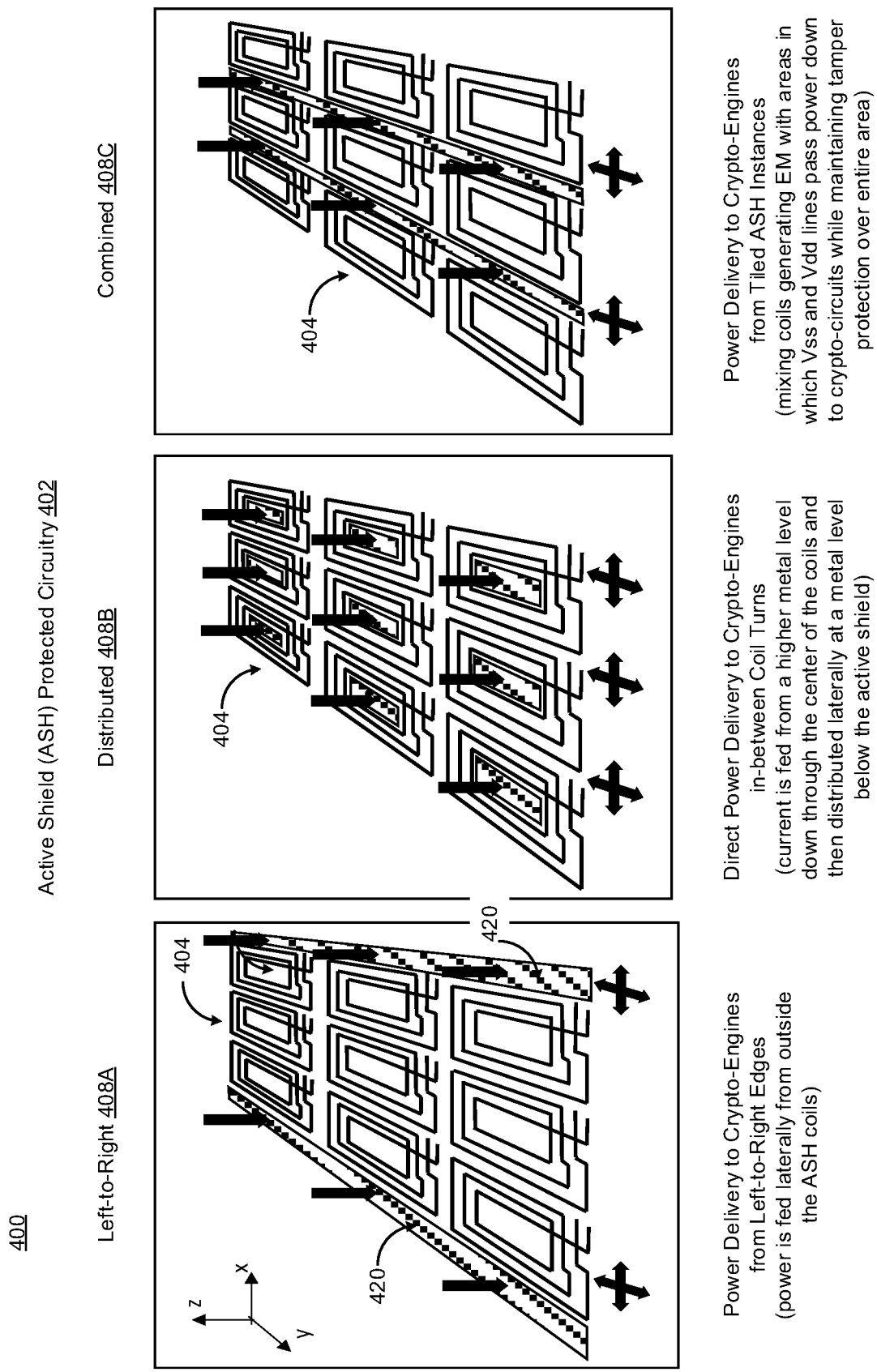
FIG. 4 illustrates different schemes used to feed power to the protected circuitry in accordance with various implementations described herein.

FIG. 4 illustrates various diagrams 400 of configurations (408A, 408B, 408C) to feed supplies (e.g., Vdd, Vss) to ASH protected circuitry 402 underling the active shield (ASH) 404 in accordance with implementations described herein.

In various implementations, as shown in FIG. 4, a first configuration whereby the power feeds (e.g., Vdd, Vss) are located at the perimeter 420 of the ASH protected circuitry 402 and distributed laterally at a metal level below the active shield (ASH) 404 may refer to a left-to-right configuration 408A. Also, a second a configuration 408B with feeds and other power supply circuitry not requiring tamper protection aligned with the coil centers is shown as a distributed configuration 408B. Further, a third configuration 408C refers to a combined configuration where spaces between coils are protected using a combination with a linear or mesh-like shield providing Vdd and Vss feeds down to the underlying circuits from a higher metal level. In reference to combined configuration 408C, the EM generated by the combined ASH (i.e., C_ASH) coils may extend laterally beyond the coils as to still provide protection against EM side channel attacks on the underlying circuits in the areas covered by a linear or mesh-like active shield.

Figure 5:
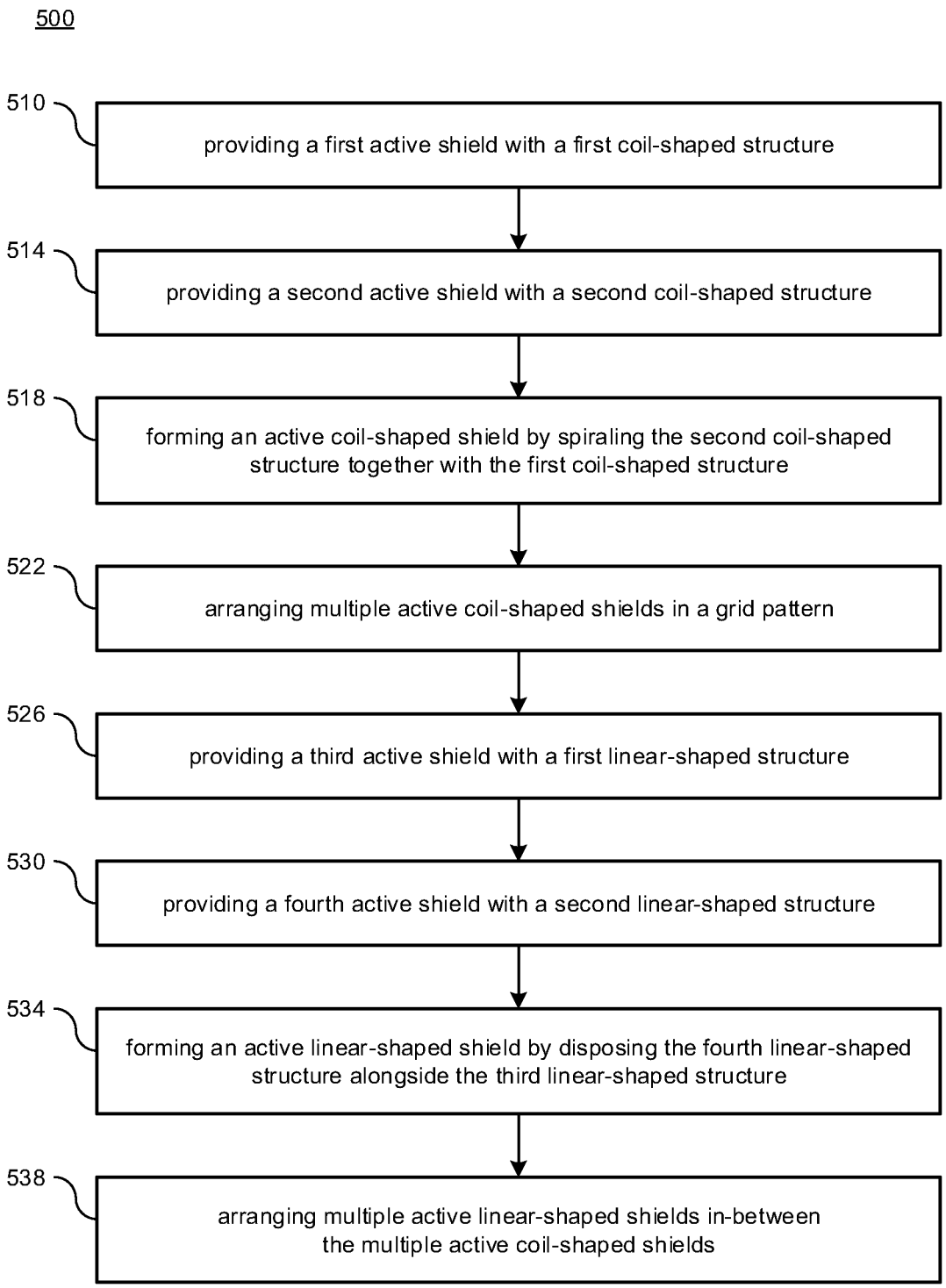
FIG. 5 illustrates a process diagram of a method for providing an active shield structure in accordance with implementations described herein.

FIG. 5 illustrates a process diagram of a method 502 for providing an active shield structure in accordance with implementations described herein.

It should be understood that even though method 500 indicates a particular order of operation execution, in some cases, various certain portions of the operations may be executed in a different order, and on different systems. In other cases, additional operations and/or steps may be added to and/or omitted from method 500. Also, method 500 may be executed using software scripts as part of a digital implementation flow for the hardware design. If executed with a software script, the method 500 may be parametrized such as to adapt various features of the design implementation to the requirements of the underlying circuitry.

In various implementations, method 500 may refer to a method of designing, building, fabricating and/or manufacturing active shield circuitry as an integrated system, device and/or circuit that may involve use of the various IC circuit components described herein so as to implement active shield schemes and techniques associated therewith. In some implementations, combining standard active shields (as a countermeasure against physical tampering) with active shield coils (as a countermeasure against EM side-channel attack provides for a noisy active shield, wherein noise is used to defend against EM attacks. Also, in some implementations, the active shield circuitry may be integrated with various control circuitry and related components on a single chip, and the active shield circuitry may be implemented in various embedded systems for various electronic, mobile and Internet-of-things (IoT) applications, including remote sensor nodes.

At block 510, method 500 may provide a first active shield with a first coil-shaped structure. At block 514, method 500 may provide a second active shield with a second coil-shaped structure. At block 518, method 500 may form an active coil-shaped shield by spiraling the second coil-shaped structure together with the first coil-shaped structure. At block 522, method 500 may arrange multiple active coil-shaped shields in a grid pattern. In some instances, each active coil-shaped shield may have the first active shield and the second active shield wound together to form a first type of active shield structure. At block 526, method 500 may provide a third active shield with a first linear-shaped structure. At block 530, method 500 may provide a fourth active shield with a second linear-shaped structure. At block 534, method 500 may form an active linear-shaped shield by disposing the fourth linear-shaped structure alongside the third linear-shaped structure. At block 538, method 500 may arrange multiple active linear-shaped shields in-between the multiple active coil-shaped shields. In some instances, each active linear-shaped shield has the third active shield and the fourth active shield disposed together to form a second type of active shield structure.

In some implementations, the first type of active shield and the second type of active shield may be combined in a single metal layer (i.e., a same metal layer) to provide an active tamper protection shield and/or an electro-magnetic (EM) shield as a counter-measure circuit for covering sensitive circuitry and/or protecting underlying cryptographic circuitry from unauthorized access.

Figure 6:
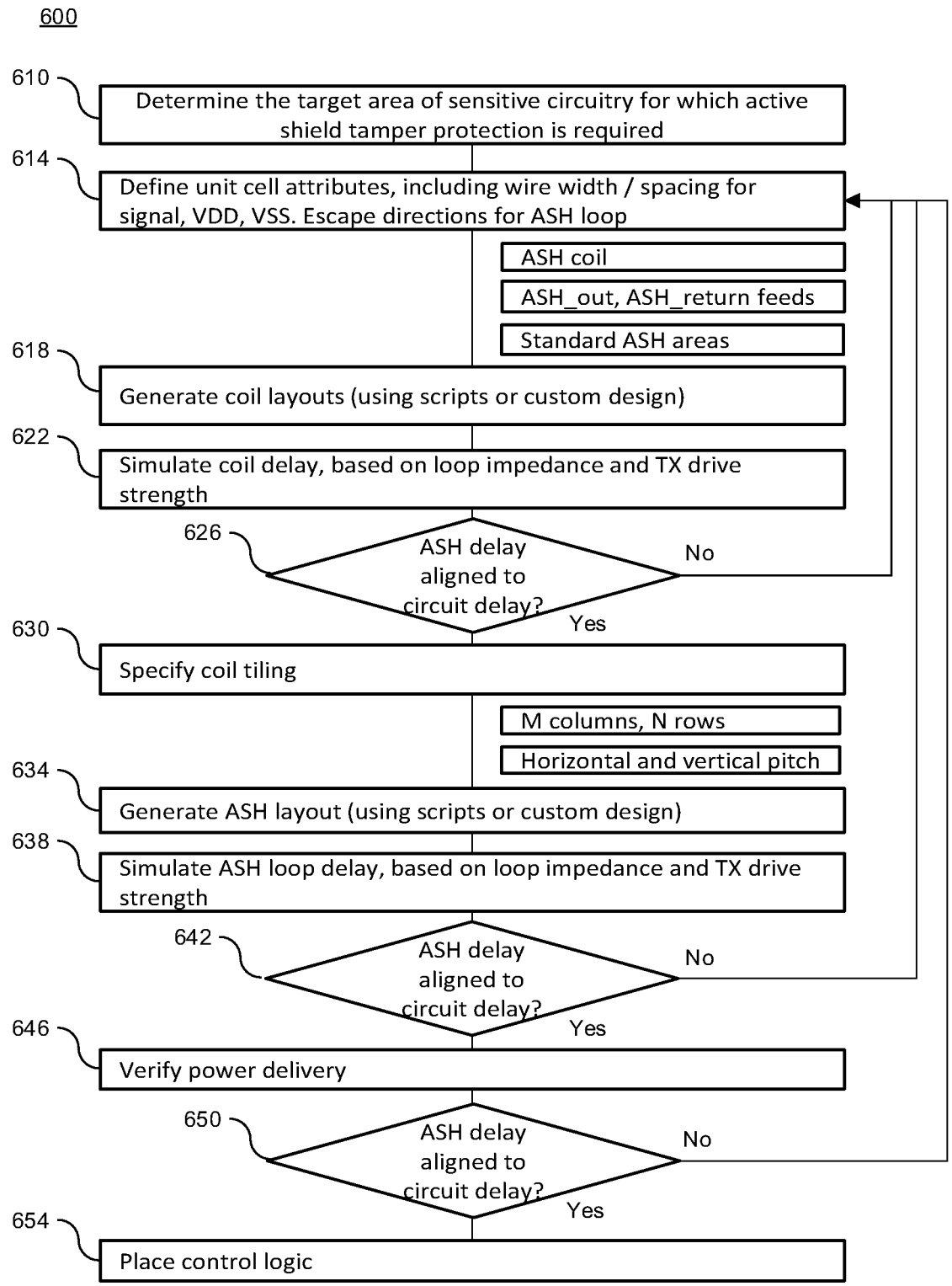
FIG. 6 illustrates another process diagram of a method for providing an active shield structure in accordance with implementations described herein.

FIG. 6 illustrates a process diagram of another method 602 for providing an active shield structure in accordance with implementations described herein.

It should be understood that even though method 600 indicates a particular order of operation execution, in some cases, various certain portions of the operations may be executed in a different order, and on different systems. In other cases, additional operations and/or steps may be added to and/or omitted from method 600. Also, method 600 may be executed using software scripts as part of a digital implementation flow for the hardware design. If executed with a software script, the method 600 may be parametrized such as to adapt various features of the design implementation to the requirements of the underlying circuitry.

In various implementations, method 600 may refer to a method of designing, building, fabricating and/or manufacturing active shield circuitry as an integrated system, device and/or circuit that may involve use of the various IC circuit components described herein so as to implement active shield schemes and techniques associated therewith. In some implementations, combining standard active shields (as a countermeasure against physical tampering) with active shield coils (as a countermeasure against EM side-channel attack provides for a noisy active shield, wherein noise is used to defend against EM attacks. Also, in some implementations, the active shield circuitry may be integrated with various control circuitry and related components on a single chip, and the active shield circuitry may be implemented in various embedded systems for various electronic, mobile and Internet-of-things (IoT) applications, including remote sensor nodes.

At block 610, method 600 may determine the target area of sensitive circuitry for which active shield tamper protection is required. At block 614, method 600 may define various unit cell attributes, including, e.g., wire width and/or wire spacing for the signal (e.g., VDD, VSS), and at block 614, method 600 may also provide escape directions for the ASH loop, including, e.g., ASH coil, ASH_out feeds, ASH_return feeds, and/or standard ASH areas. At block 618, method 600 may generate coil layouts using scripts and/or custom designs. At block 622, method 600 may simulate coil delay based on loop impedance and TX drive strength. At decision block 626, method 600 may determine whether ASH delay is aligned to circuit delay. If no, then method 600 returns to block 614. Otherwise, if yes, then method 600 proceeds to block 630. At block 630, method 600 may specify coil tiling, which may include a number (M) of columns and a number (N) of rows along with horizontal pitch and vertical pitch. At block 634, method 600 may generate the ASH layout using scripts and/or custom designs. At block 638, method 600 may simulate ASH loop delay based on loop impedance and/or TX drive strength. At decision block 642, method 600 may determine whether ASH delay is aligned with circuit delay. If no, then method 600 returns to block 614. Otherwise, if yes, then method 600 proceeds to block 646. At block 646, method 600 may verify power delivery. At decision block 650, method 600 may determine whether ASH delay is aligned with circuit delay. If no, then method 600 returns to block 614. Otherwise, if yes, then method 600 proceeds to block 654. At block 654, method 600 may place control logic.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device. The device may include a first coil-shaped spiral structure for an active shield. The device may include a second coil-shaped spiral structure that is wound in-between windings of the first coil-shaped spiral structure. The first coil-shaped spiral structure may provide for a coil-based EM shield as a counter-measure circuit for protecting an underlying circuit.

Described herein are various implementations of a device. The device may include a first type of active shield having a coil-shaped structure. The device may include a second type of active shield having a linear-shaped structure disposed adjacent to the first type of active shield. The first type of active shield and the second type of active shield may provide an active tamper protection shield and an EM shield as a counter-measure circuit for protecting an underlying cryptographic circuit.

Described herein are various implementations of a method. The method may provide a first active shield with a first coil-shaped structure, and the method may provide a second active shield with a second coil-shaped structure. The method may form an active coil-shaped shield by spiraling the second coil-shaped structure together with the first coil-shaped structure. The first type of active shield and the second type of active shield may provide an active tamper protection shield and an EM shield as a counter-measure circuit for protecting an underlying cryptographic circuit.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
an array of active shield coil structures, wherein each active shield coil structure comprises:
a first coil-shaped spiral structure for an active shield; and
a second coil-shaped spiral structure that is wound in-between windings of the first coil-shaped spiral structure, wherein:
the first coil-shaped spiral structure provides for a coil-based electro-magnetic (EM) shield as a counter-measure circuit for protecting an underlying circuit, and
wherein the array of the active shield coil structures is arranged in a grid pattern.

2. The device of claim 1, wherein:
the array is arranged in the grid pattern across a same layer at least one of covering or overlaying the underlying circuit; and
the active shield comprises a conductive interconnect line for transceiving a characteristic code between a transmit node and a receive node, and wherein the active shield is disposed such that a plurality of the conductive interconnect lines covers an area of sensitive circuitry at routing levels and device levels disposed below the active shield.

3. The device of claim 1, wherein:
the first coil-shaped spiral structure is formed of a first conductive wire, and wherein the second coil-shaped spiral structure is formed of a second conductive wire that is separate from the first conductive wire, and wherein the first coil-shaped spiral structure and the second coil-shaped spiral structure are formed in a same layer.

4. The device of claim 3, wherein a width of the first conductive wire is greater than a width of the second conductive wire.

5. The device of claim 1, wherein the first coil-shaped spiral structure comprises a first continuous coil-shaped spiral structure.

6. The device of claim 1, wherein the first coil-shaped spiral structure is coupled to a signal generator that provides a signal for generating an electro-magnetic (EM) field across the active shield.

7. The device of claim 6, wherein the first coil-shaped spiral structure and the second coil-shaped spiral structure are disposed in a same layer that overlies a cryptographic circuit, and wherein a frequency of the signal is aligned or harmonic with an operating frequency of the cryptographic circuit.

8. The device of claim 7, wherein the signal transmitted into the first coil-shaped spiral structure has the same frequency and phase as the digital clock driving the underlying circuit.

9. The device of claim 1, wherein the first coil-shaped spiral structure and the second coil-shaped spiral structure provide for a combined coil-based active tamper protection shield as a counter-measure circuit for protecting an underlying circuit from unauthorized attempts to access signals or physically modify underlying circuitry.

10. The device of claim 1, wherein the first coil-shaped spiral structure provides the counter-measure circuit for protecting the underlying circuit from unauthorized access via an EM side-channel attack.

11. The device of claim 1, wherein:
the second coil-shaped spiral structure is coupled directly to a single fixed potential,
the fixed potential is a ground supply, and wherein the second coil-shaped spiral structure operates as a ground supply line that is coupled directly to the ground supply, and
the fixed potential is configured to transfer power to the underlying circuit.

12. The device of claim 1, wherein:
the second coil-shaped spiral structure is coupled directly to a single fixed potential,
the fixed potential is a voltage supply, and wherein the second coil-shaped spiral structure operates as a voltage supply line that is coupled directly to the voltage supply, and
the fixed potential is configured to transfer power to the underlying circuit.

13. The device of claim 1, wherein:
the array of active shield coil structures is arranged in a two-dimensional array, and
the two-dimensional array comprises a plurality of columns and a plurality of rows.

14. The device of claim 13, wherein:
each active shield coil structure of the array is configured with a respective transmit line and a respective return line to transmit an electro-magnetic (EM) signal therebetween.

15. The device of claim 13, wherein:
adjacent active shield coil structures of the array are configured to be driven with different current directions, and
the different current directions minimize a cancelation of one or more electro-magnetic (EM) fields.

16. The device of claim 1, wherein a respective underpass line is configured to couple a respective coil-shaped spiral structure to a respective return line.

17. The device of claim 16, wherein the respective underpass line is formed on a different metal layer than a metal layer used to form the respective coil-shaped spiral structure.

18. The device of claim 17, further comprising: one or more vias configured to couple the respective underpass line to the respective coil-shaped spiral structure and the respective return line.

* * * * *